United States Patent [19]
Bergskoog

[11] 3,897,084
[45] July 29, 1975

[54] STAND-OUT

[76] Inventor: Robert C. Bergskoog, R.R. No. 2, Holdrege, Nebr. 68949

[22] Filed: Jan. 22, 1973

[21] Appl. No.: 315,177

[52] U.S. Cl. .............................................. 280/166
[51] Int. Cl. ............................................ B60r 3/02
[58] Field of Search ........... 280/166, 164; 182/91 X

[56] References Cited
UNITED STATES PATENTS

| | | | |
|---|---|---|---|
| 2,533,050 | 12/1950 | Runyan | 280/166 |
| 2,568,093 | 9/1951 | Smid | 280/166 X |
| 3,406,984 | 10/1968 | Kilbey | 280/166 |

*Primary Examiner*—Robert R. Song
*Attorney, Agent, or Firm*—Cameron, Kerkam, Sutton, Stowell & Stowell

[57] ABSTRACT

A truck box access apparatus adapted to be mounted along the inside of the lower sill of the truck comprising a pair of spaced vertical parallel support bars having brackets at one end of each of the bars for mounting the apparatus along the inside of the lower sill of a truck body. A pair of cross bars are disposed at the other end of each of the support bars. The cross bars extend between the support bars and are spaced from each other. A step platform is slidably supported between the cross bars and between first and second extreme positions. The step platform in its first extreme position extends outwardly from the support bars and at a right angle thereto and in its second position is nested flush between the bars.

8 Claims, 2 Drawing Figures

PATENTED JUL 29 1975　　3,897,084

STAND-OUT

BACKGROUND OF THE INVENTION

My invention relates to a truck box access apparatus, particularly the type used by truck operators, loading and unloading personnel, load inspectors, etc., where periodic access or entrance must be gained either from the side of or the rearmost location on the cargo body of a truck.

DESCRIPTION OF THE PRIOR ART

Previous known devices, such as ladders, grab type climbing handles and such which have attempted to meet this purpose are subject to undesirable disadvantages such as being potentially dangerous to the user, often inflicting damage to other property, and sustaining damage to the apparatus itself by reason of its vulnerability. Attempts have been made to the use of a ladder that is portable by incorporating removable hooks, as the ladder left hanging and extending on the side would cause the truck box to be over allowable width limits. Furthermore, this practice creates a storage problem, as the ladder still must remain with the truck. If the ladder is left hanging in its usable position on the truck box, the risk is great that it may dislodge itself in transport or when raising the truck box for unloading, thus rendering itself as a dangerous missile to traffic on the highway or anyone in its proximity. Ladders which use supporting hooks and similar devices also can be clearly defined as unsafe due to the fact they often are unstable or capable of being dislodged by the operator attempting to climb them. This movement may cause the operator to lose his hold or grip on the device, or his footing on same, often resulting in injury.

Most previous devices incorporated for the purposes of entering or exiting a truck box or van body in the rearmost area consist of a permanently mounted, either bolted or welded into place, step or bar of some sort to step on. They can be one or the other, of basically two types, flush mounted to prevent damage to the aforementioned structure in the event of backing the vehicle against a loading dock, or the protruding type, which gives better means of support and safety for entering and exiting, but still is highly vulnerable to damage especially when the truck is backed against loading docks.

Some additional disadvantages to be noted in the above mentioned structures are that some protruding types of steps are designed as such that they may be retracted or folded out of the way when not in use by hinging the supporting platform and securing its retainment by the use of ratchet type locking mechanisms, tension springs, or a combination of both. The continuing workability and safety of this type of apparatus, to be fully met, must be periodically inspected to ensure that care be taken to ensure that it is maintained to a degree that will keep in functioning properly at all times so that it does not render injury to its user.

SUMMARY OF THE INVENTION

The object of my invention is to provide truck box access apparatus of the type and nature which overcomes or dispels completely all the inherent disadvantages of the aforementioned structures. Other more specific objects will appear from the description hereinafter, and the features of novelty will be pointed out in the claim.

BRIEF DESCRIPTION OF THE DRAWINGS

FIG. 1 illustrates the apparatus with its platform positioned up and outward - for use by the operator.

FIG. 2 illustrates the apparatus with its platform positioned in and down - the stored position.

DESCRIPTION OF THE PREFERRED EMBODIMENT

Figure 1:
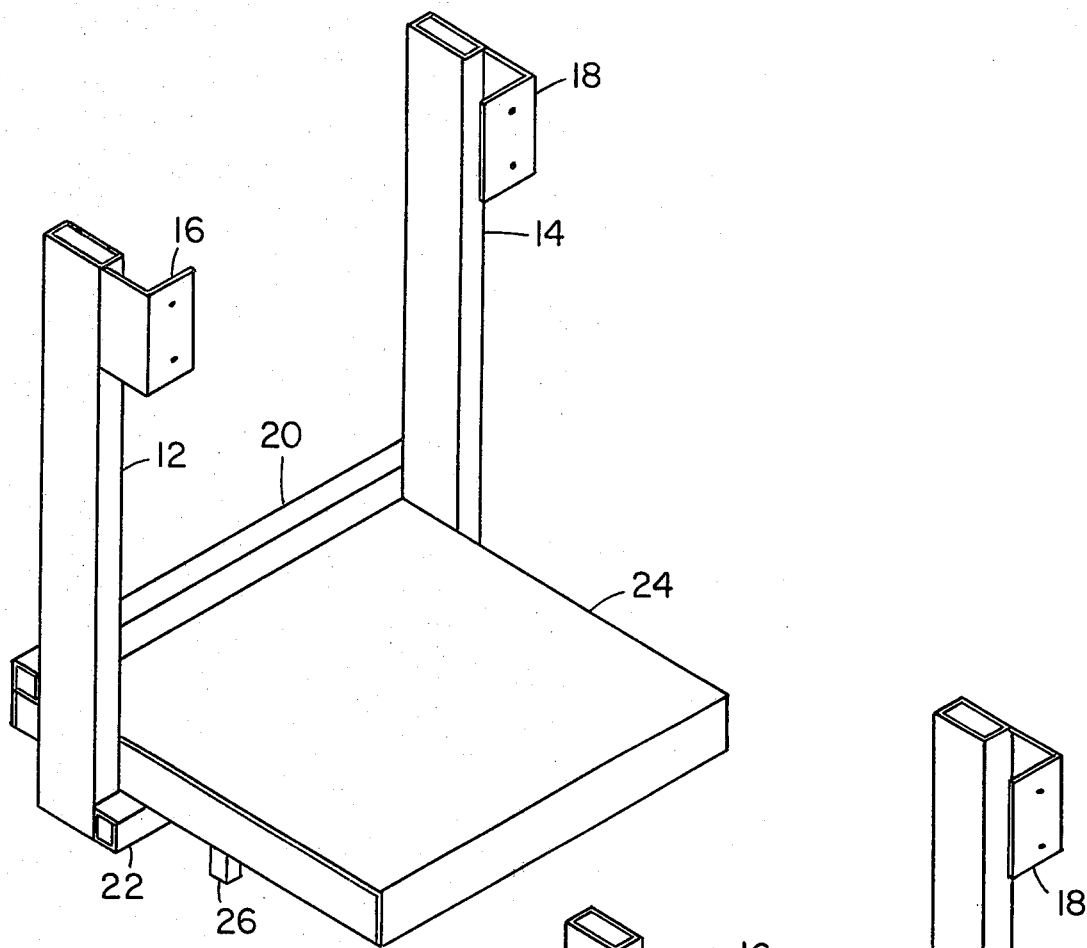
FIGS. 1 and 2 illustrate in two perspective views, the novel truck box access apparatus of the present invention.

Referring to the drawings, it will be seen that my platform step is relatively simple in construction comprising two spaced vertical support posts 12, 14, each having affixed thereto on its forwardmost side, as viewed in the drawing, a right angle mounting bracket 16, 18, respectively. Each bracket includes a pair of mounting bolt access holes. Intermediate the ends of the spaced posts, there is conveniently mounted crosswise a bar 20. A second cross bar 22 is conveniently mounted across the extreme lowermost end of the posts. As shown in the drawings, the first cross bar 20 is mounted on the back side of the mounting posts while the second cross bar 22 is mounted on the front side of the mounting posts.

Bars 20 and 22 are spaced from each other and slidably receive therebetween a step platform 24. Platform 24 includes two pairs of downward depending stops. The first pair of stops 30, 32 limit outward extension of the slidable platform step 24 and comprise a pair of depending lugs mounted at the rearmost corners of the underside of the platform as viewed in the drawing. The second pair of stops 26, 28 limit inward extension of the slidable platform step 24 and comprise a pair of depending lugs mounted to the underside of the step platform at opposite sides thereof and inward or forward of lugs 30, 32 as viewed in the drawing.

Figure 2:
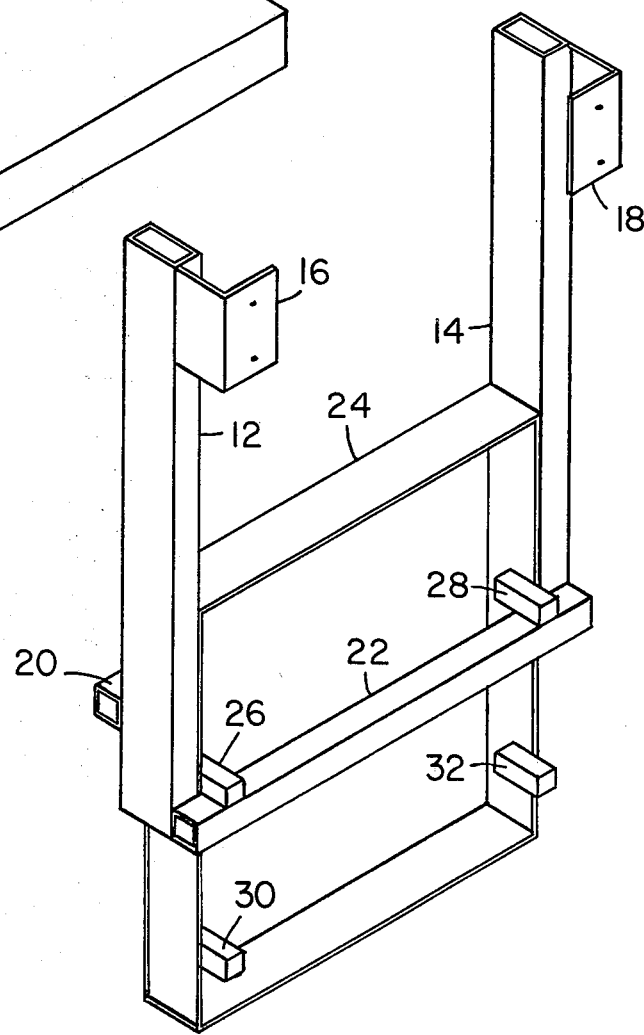

It should be apparent that in the extended position, the step is overbalanced, tending to pivot clockwise about bar 22, but movement is restrained by bar 20. In the storage position, FIG. 2, the step is slid backwards until it can be pivoted counterclockwise about bar 22, bar 20 now retaining backward movement of the step which is held in place between bars 20 and 22 by lugs 26 and 28.

The invention contemplates essentially the advantages of design as such to allow a permanent mounting in any location so desired along the inside of the lower sills of the truck box or bed, excepting directly above the wheels of the truck, and may be affixed thereto either by means of bolting, riveting, or welding its vertical member attachment points comprising two sets of holes in each mounting bracket 16 and 18 as depicted in the drawing as such, by having bolt holes provided for mounting. Further, the advantages of my invention are that the unit, when properly mounted as outlined above, protrudes sufficiently to enable the user a distinctively more comfortable approach regarding ascension, even while carrying the objects he is loading, contributing thusly to less fatigue and a much higher degree of safety.

The novel construction provides several advantages. For example, it is absolutely self storing when not in use, having no protruding parts within a reasonable distance from the innermost perimeter of the truck box or body. The user simply lifts the outermost edge of the step platform, causing it to retract and fall into the in and down stored position. A pull up and out readily positions the step for use again. In the event of the vehicle being backed into a loading dock, the step having not previously being returned to its stored position before transport, the step, upon contact with the dock, and allowing a further travel of approximately three inches, will automatically retire itself to the in and downward position, receiving no damage. My invention also has the unique capability of being unsusceptible to accidently returning to the up and outward or use position during transport, deriving this valuable safety feature from the effect of the overcenter and downward overbalance effected by the two sets of properly spaced stops depicted in the drawings.

While the novel apparatus as set forth hereinbefore is particularly adapted for use in connection with truck box access, said apparatus may be effiicently combined with vehicles or structures of other types requiring ingress or egress, and in such case will add a measurable rate of efficiency and safety thereof in approximately the manner as set forth herein. Various changes in the forms shown and described may be made within the scope of the claim without departing from the spirit of the invention.

I claim:

1. A truck box access apparatus adapted to be mounted along the inside of the lower sill of the truck comprising a pair of spaced parallel support members [12, 14] means [16, 18] at one end of each of said support members for mounting said apparatus along the inside of the lower sill, a first [20] and a second [22] cross bar disposed at the other end of each said support members, said first and said second cross bars extending between said support members and being spaced from each other, both longitudinally and transversely with respect to the longitudinal direction of the support members, a step platform [24] slidably supported between said first and said second bars and between first and second extreme positions, said step platform in its first extreme position extending outwardly from said support members and at a right angle thereto and said step platform in its second position being nested flush between said support members.

2. A truck box as set forth in claim 1 wherein said platform step includes first stop means [26, 28] for limiting outward extension of said step.

3. A truck box as set forth in claim 2 wherein said platform step includes second stop means [30, 32] for limiting inward extension of said step.

4. A truck box as set forth in claim 3 wherein said first stop means and said second stop means comprise respectively, a first [26, 28] and a second [30, 32] set of lugs disposed at opposite sides of said platform and depending therefrom, said first and said second set of lugs being positioned on opposite sides of said second cross bar [22].

5. A truck box as set forth in claim 3 wherein said first stop means includes a first set of lugs depending from said platform, said second stop means includes a second set of lugs depending from said platform, said lugs being spaced from each other such that said first set limits the outward extent of said step and said second set limits the extent of said step in its second position.

6. A truck box as set forth in claim 1 wherein said support members are oriented in a vertical plane, said step being nested in the plane of said support members when in its second extreme position and being in a horizontal plane, when in said first extreme position, said first bar [20] extending over said step [24] and adjacent one edge thereof when said step is in its first extreme position and said second bar [22] extending beneath said step and spaced fron said one edge such that the said step may pivot about said bar when being moved between said extreme positions.

7. A truck box as set forth in claim 6 including a stop means depending from said step to limit slidable movement of the platform, said stop means being positioned to one side of the center of said step so as to permit said step to pivot about said second cross bar after limited slidable movement away from its first extreme position.

8. A truck box as set forth in claim 1 including a stop means depending from said step to limit slidable movement of the platform, said stop means being positioned to one side of the center of said step so as to permit said step to pivot about said second cross bar after limited slidable movement away from its first extreme position.

* * * * *